United States Patent
Pastore et al.

(10) Patent No.: US 10,389,226 B1
(45) Date of Patent: Aug. 20, 2019

(54) CONTROLLER WITH RIPPLE COMPENSATION

(71) Applicant: POWER INTEGRATIONS, INC., San Jose, CA (US)

(72) Inventors: Tiziano Pastore, Los Gatos, CA (US); Sundaresan Sundararaj, Union City, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 16/168,611

(22) Filed: Oct. 23, 2018

(51) Int. Cl.
| | |
|---|---|
| *H02M 1/14* | (2006.01) |
| *H02M 3/335* | (2006.01) |
| *H02M 1/00* | (2006.01) |

(52) U.S. Cl.
CPC ............. *H02M 1/143* (2013.01); *H02M 1/14* (2013.01); *H02M 3/33507* (2013.01); *H02M 2001/0025* (2013.01); *H02M 2001/0032* (2013.01)

(58) Field of Classification Search
CPC ....... H02M 3/335–33592; H02M 1/14; H02M 1/143; H02M 2001/0032
See application file for complete search history.

(56) References Cited

U.S. PATENT DOCUMENTS

| | | | |
|---|---|---|---|
| 7,502,236 B2 | 3/2009 | Bäurle et al. | |
| 7,535,735 B2 | 5/2009 | Cuadra et al. | |
| 7,760,523 B2 | 7/2010 | Mayell et al. | |
| 8,035,254 B2 | 10/2011 | Djenguerian et al. | |
| 8,294,377 B2 | 10/2012 | Kang et al. | |
| 8,305,063 B2 | 11/2012 | Wang et al. | |
| 8,368,370 B2 | 2/2013 | Morrish | |
| 8,446,135 B2 * | 5/2013 | Chen .................... | H02M 3/156 323/271 |
| 9,271,352 B2 | 2/2016 | Mao et al. | |
| 9,473,031 B2 * | 10/2016 | Mao .................. | H02M 3/33507 |
| 9,780,666 B2 | 10/2017 | Odell et al. | |
| 9,804,205 B2 | 10/2017 | Duvjnak et al. | |
| 2002/0180410 A1 * | 12/2002 | Brooks ................. | H02M 3/156 323/282 |
| 2007/0047268 A1 * | 3/2007 | Djenguerian ..... | H02M 3/33515 363/21.13 |
| 2008/0088284 A1 * | 4/2008 | Weng .................. | H02M 3/1563 323/271 |

(Continued)

*Primary Examiner* — Fred E Finch, III
*Assistant Examiner* — Rafael O. De León Domenech
(74) *Attorney, Agent, or Firm* — Christensen O'Connor; Johnson Kindness PLLC

(57) ABSTRACT

A controller for use in a switched mode power converter includes a comparator coupled to compare an output sense signal representative of an output of the switched mode power converter to a target value. A ripple compensation block is coupled to generate a compensation signal in response to the output sense signal. The compensation signal is a fraction of the output sense signal. A request control is coupled to generate a request signal having a request frequency in response to an output of the comparator and a clock signal to control an operational state of a power switch of the switched mode power converter. The request control is further coupled to receive the compensation signal to modulate the request frequency of the request signal with the compensation signal in response to the output of the comparator to provide ripple compensation at the output of the switched mode power converter.

32 Claims, 9 Drawing Sheets

(56) References Cited

U.S. PATENT DOCUMENTS

| | | | |
|---|---|---|---|
| 2008/0246447 A1 | 10/2008 | Djenguerian et al. | |
| 2010/0066414 A1 | 3/2010 | Wang | |
| 2011/0110126 A1* | 5/2011 | Morrish | H02M 1/44 |
| | | | 363/21.18 |
| 2011/0194311 A1* | 8/2011 | Gaknoki | H02M 7/217 |
| | | | 363/21.12 |
| 2013/0155724 A1 | 6/2013 | Bäurle | |
| 2013/0329462 A1* | 12/2013 | Duvnjak | H02M 3/33523 |
| | | | 363/15 |
| 2014/0132232 A1* | 5/2014 | MacLean | G05F 1/62 |
| | | | 323/271 |
| 2014/0225578 A1* | 8/2014 | Lin | G05F 1/445 |
| | | | 323/271 |
| 2014/0369097 A1* | 12/2014 | Prescott | H02M 1/4225 |
| | | | 363/89 |
| 2015/0244269 A1* | 8/2015 | Yu | H02M 3/156 |
| | | | 323/284 |
| 2015/0366010 A1* | 12/2015 | Mao | H05B 33/0815 |
| | | | 315/223 |
| 2017/0207711 A1* | 7/2017 | Balakrishnan | H02M 1/36 |
| 2018/0248466 A1 | 8/2018 | Pham et al. | |

* cited by examiner

| STATE (CT/ST) | $f_{REQ}$ | $t_{ON}$ |
|---|---|---|
| 0 | $f_0$ | $t_0$ |
| 1 | $f_1$ | $t_1$ |
| | ..... | |
| $2^N$ | $f_{2N}$ | $t_{2N}$ |

300

$f_{REQ}, t_{ON}$ ←

VCO: f(ST) = $T_{REQ}$ = 1/$f_{REQ}$
ARITHMETIC OPERATOR:
ADD: OS>TARGET
SUBTRACT: OS<TARGET

FIG. 3A

| STATE (CT/ST) | $f_{REQ}$ | $t_{ON}$ |
|---|---|---|
| 0 | $f_0$ | $t_0$ |
| 1 | | |
| | ..... | |
| $2^N$ | $f_{2N}$ | $t_{2N}$ |

301

→ $f_{REQ}, t_{ON}$

VCO: f(ST) = $f_{REQ}$ = 1/$T_{REQ}$
ARITHMETIC OPERATOR:
ADD: OS<TARGET
SUBTRACT: OS>TARGET

FIG. 3B

CONTROLLER WITH RIPPLE COMPENSATION

BACKGROUND INFORMATION

Field of the Disclosure

The present invention relates generally to power converters, and more specifically to switched mode power converters.

Background

Electronic devices use power to operate. Switched mode power converters are commonly used due to their high efficiency, small size and low weight to power many of today's electronics. Conventional wall sockets provide a high voltage alternating current. In a switching power converter, a high voltage alternating current (ac) input is converted to provide a well-regulated direct current (dc) output through an energy transfer element. In operation, a switch is utilized to provide the desired output by varying the duty cycle (typically the ratio of the on-time of the switch to the total switching period), varying the switching frequency, or varying the number of pulses per unit time of the switch in a switched mode power converter.

The switched mode power converter also includes a controller. Output regulation may be achieved by sensing and controlling the output in a closed loop. The controller may receive a signal representative of the output, and the controller varies one or more parameters in response to the signal to regulate the output to a desired quantity. Various modes of control may be utilized such as pulse width modulation (PWM) control, pulse frequency modulation (PFM) control, or ON/OFF control. In one example, switched mode power converters are used to provide regulated power to light emitting diode (LED) devices.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3A is a state table illustrating an example relationship between frequency, on-time, and the arithmetic operator of FIG. 2 in accordance with embodiments of the present invention.

FIG. 3B is a state table illustrating another example relationship between frequency, on-time, and the arithmetic operator of FIG. 2 in accordance with embodiments of the present invention.

Figure 1A:
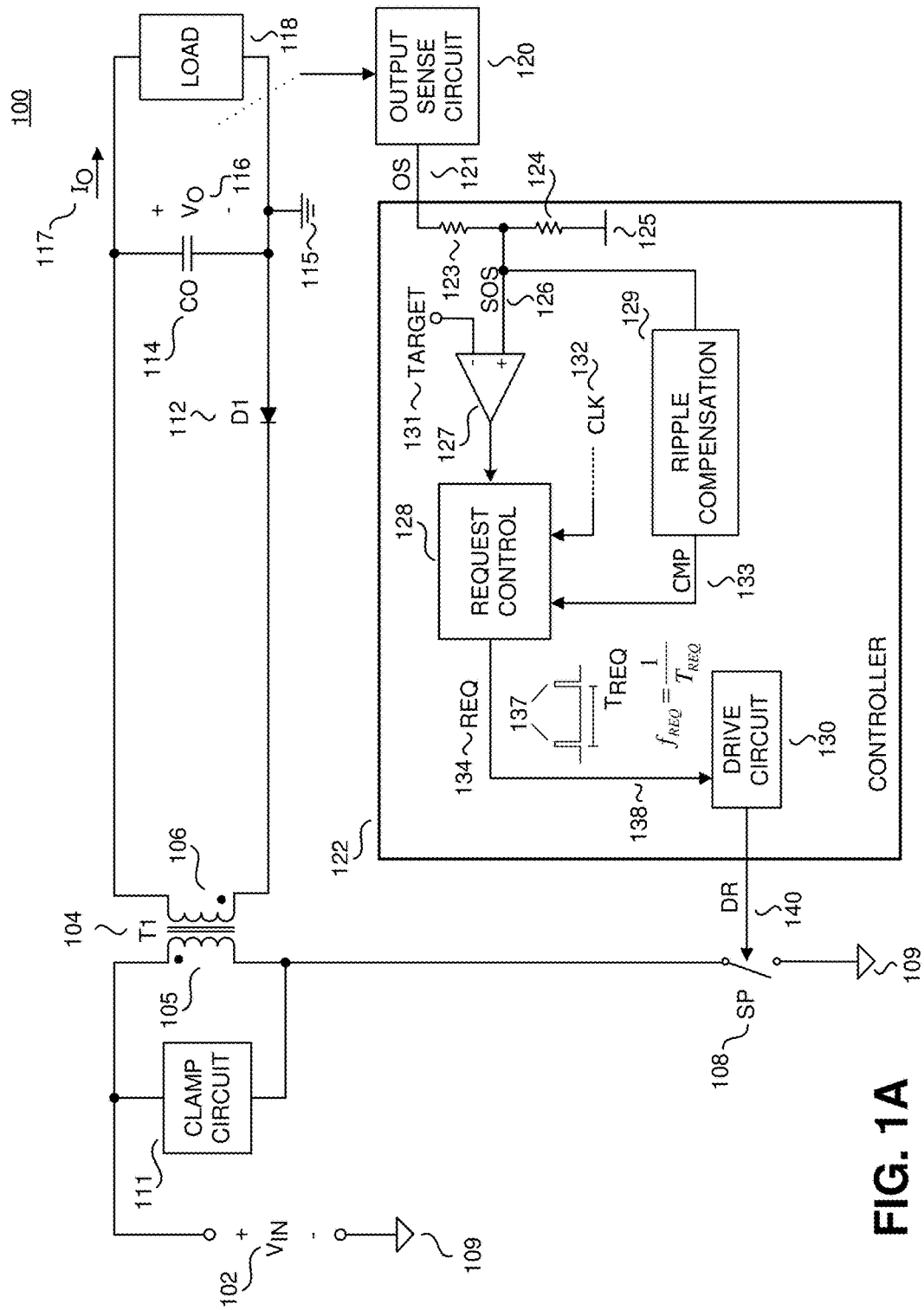
FIG. 1A is a schematic illustrating an example power converter and controller with ripple compensation in accordance with an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Output regulation may be achieved by sensing and controlling the output of a power converter in a closed loop. The controller may receive a signal representative of the output and then vary one or more parameters of the power switch in response to the signal to regulate the output to a desired quantity. The speed at which the controller responds to variations in the output can affect the amount of ripple observed at the output. The quicker the controller responds, the less ripple is generally seen at the output. Power converters that attempt to maintain power factor close to unity and minimize total harmonic distortion generally have limited feedback loop bandwidth with a cutoff frequency below 10 Hertz (Hz) and are generally unable to filter out the rectified main frequency from the output. Further, the transient response may take a long time to settle and ripple may be observed at the output.

Embodiments of the present disclosure included a controller with ripple compensation. The sensed output is compared to a target value and one or more parameters of the power switch are controlled in response to the comparison of the sensed output with the target value. For example, the switching frequency, duty ratio, on-time, off-time, or the number of switching events over time could be utilized to determine how much energy is delivered to the output of the power converter. If the sensed output is greater than the target value, this may indicate that the power converter is over-delivering power, and the power switch is controlled to transfer less energy to the output. If the sensed output is less than the target value, this may indicate that the power converter is under-delivering power, and the power switch is controlled to transfer more energy to the output. In addition, the difference from the target value may be used to set the operating condition of the power converter. For ripple compensation, a portion or a fraction of the sensed output of the power converter is used to modulate the switching frequency of the switching events.

In example embodiments, a state machine is coupled to receive the comparison between the sensed output and the target value. The output of the state machine sets the operating condition (such as switching frequency and on-time) of the power switch. A portion or fraction of the sensed output modulates the output of the state machine to provide ripple compensation of the output of the power converter.

To illustrate, FIG. 1A is a schematic illustrating an example switched mode power converter 100 and controller 122 with ripple compensation block 129 in accordance with an embodiment of the present disclosure. In one example, the power converter 100 provides output power to the load 118 from an unregulated input voltage $V_{IN}$ 102, which in one example is a rectified ac line voltage or a rectified and filtered ac line voltage. In the depicted example, the input voltage $V_{IN}$ 102 is a full wave rectified voltage having a line cycle 103, which includes two half line cycles of an ac input voltage waveform. In one example, the ac input voltage waveform may be received from a varying ac line, and the power converter 100 is a power factor corrected (PFC) power converter. The input voltage $V_{IN}$ 102 is coupled to the energy transfer element 104. In some embodiments, the energy transfer element 104 may be a coupled inductor, transformer, or an inductor. The example energy transfer element 104 shown in FIG. 1A includes two windings, a primary winding 105 and a secondary winding 106. However, in other examples, the energy transfer element 104 may have more than or less than two windings. Coupled across the primary winding 105 is the clamp circuit 111, which limits the maximum voltage across a power switch SP 108 that is coupled to the primary winding 105 and an input return 109 as shown.

The secondary winding 106 is coupled to the output rectifier D1 112, which in the depicted example is shown as a diode. However, in another example, it is appreciated that the output rectifier D1 112 may be substituted with a transistor used as a synchronous rectifier. An output capacitor CO 114 is shown as being coupled to the output rectifier D1 112 and output return 115. As will be discussed, the power converter 100 further includes a controller 122 to regulate the output of power converter 100. In general, the output of the power converter 100 is an output voltage $V_O$ 116, an output current $I_O$ 117, or a combination of the two. An output sense circuit 120 is coupled to sense the output of the power converter 100 to provide the output sense signal OS 121, also sometimes referred to as a feedback signal. The output sense signal OS 121 may be representative of the energy delivered by the energy transfer element T1 104. The output sense signal OS 121 may be representative of the output voltage $V_O$ 116, an output current $I_O$ 117, or a combination of the two.

In the illustrated example, the power converter 100 is shown as having a flyback topology. It is appreciated that other known topologies and configurations of power converters may also benefit from the teachings of the present disclosure. In the depicted example, the input of power converter 100 is galvanically isolated from the output of power converter 100, such that input return 109 is galvanically isolated from output return 115. Since the input and output of power converter 100 are galvanically isolated, there is no direct current (dc) path across the isolation barrier of energy transfer element T1 104, or between primary winding 105 and secondary winding 106, or between input return 109 and output return 115. However, it should be appreciated that non-isolated converter topologies may benefit from the teachings of the present disclosure.

As shown in the depicted example, power converter 100 includes a controller 122 coupled to receive the output sense signal OS 121. The controller 122 is coupled to generate the drive signal DR 140 in response to the output sense signal OS 121. The drive signal DR 140 controls the turn on and turn off of the power switch SP 108. In one example, the drive signal DR 140 is a rectangular pulse waveform with varying durations of logic high and logic low sections. In one example, a logic high value in the drive signal DR 140 turns on the power switch SP 108 while a logic low value turns off the power switch SP 108. The duration of the logic high section may be referred to as the on-time of the power switch SP 108 while the duration of the logic low sections may be referred to as the off-time of the power switch SP 108. Further, the sum of the on-time and the off- may be referred to as the switching period, which is the inverse of the switching frequency.

To regulate the output provided to the load 118, the controller 122 may vary one or more switching parameters of the power switch SP 108. Example parameters may include the on-time, off-time, and switching frequency/ switching period. The various values which the controller 122 may choose for the switching parameters may be referred to as the operational states. In one example, the controller 122 may control the switching frequency and the on-time of power switch SP 108 and the various values for the switching frequency and on-time may be the operational states. As will be further discussed, the controller 122 may increase the switching frequency of the power switch SP 108 to deliver more energy to the load 118. Further, increased switching frequency may correspond with larger on-times for the power switch SP 108.

The controller 122 is shown as including resistors 123 and 124, comparator 127, request control 128, ripple compensation block 129, and drive circuit 130. Resistors 123 and 124 are coupled together as a voltage divider for the received output sense signal OS 121 and referenced to return 125. As will be further discussed, return 125 may be the input return 109, output return 115, or another value. The divided value of output sense signal OS 121 is shown as scaled output sense signal SOS 126. Thus, the scaled output sense signal SOS 126 is a scaled representation of the output of the power converter 100. Comparator 127 is coupled to receive the output sense signal SOS 126 and target value 131. As shown, the scaled output sense signal SOS 126 is received at the non-inverting input of comparator 127 while the target value 131 is received at the inverting input. In one example, the target value 131 is a constant that is representative of a target output value for the output of the power converter 100. In another example, target value 131 may be variable. For example, the target output value for the output voltage of the power converter 100 may be programmable and as such the target value 132 is variable.

Request control 128 is coupled to receive the output of comparator 127 and outputs the request signal REQ 134. The request signal REQ 134 may include request events 137 that are generated in response to the comparison of the scaled output sense signal SOS 126 to the target value 131 and indicates that the controller 122 should turn on the power switch SP 108. The request signal REQ 134 may be a rectangular pulse waveform which pulses to a logic high value and quickly returns to a logic low value. The logic high pulses may be referred to as request events 137. The time between leading edges of the request events 137 (or trailing edges) may be referred to as the request period $T_{REQ}$ and the request frequency $f_{REQ}$ is the reciprocal of the request period $T_{REQ}$. The request frequency $f_{REQ}$ (and ergo the request period $T_{REQ}$) of the request events 137 may be responsive to the output sense signal OS 121 (via the comparison of the scaled output sense signal SOS 126 to the target value 131). In one example, the request frequency $f_{REQ}$ increases if the scaled output sense signal SOS 126 is less than the target value 131 and decreases if the scaled output sense signal SOS 126 is greater than the target value 131. The speed at which the request control 128 updates the frequency $f_{REQ}$ of the request signal REQ 134 in response to the output sense signal OS 121 is responsive to the frequency of the clock signal CLK 132.

Drive circuit 130 is coupled to receive the request signal REQ 134 through a communication link 138. In the example shown, the drive circuit 130 is coupled to turn on the power switch SP 108 in response to the request events 137. In particular, the drive circuit 130 is coupled to generate the drive signal DR 140 in response to the request events 137 in the request signal REQ 134, which is coupled to control switch of the power switch SP 108 to control the transfer of energy from an input to an output of the power converter. For example, the drive circuit 130 may transition the drive signal DR 140 to a logic high value (to turn on power switch SP 108) in response to a received enable event 137.

It is generally understood that a switch that is closed may conduct current and is considered on, while a switch that is open cannot conduct current and is considered off. In one example, the power switch SP 108 may be a transistor such as a metal-oxide-semiconductor field-effect transistor (MOSFET), bipolar junction transistor (BJT), silicon carbide (SiC) based transistor, gallium nitride (GaN) based transistor, or an insulated-gate bipolar transistor (IGBT). The frequency of the request events 137 (i.e., $f_{REQ}$) sets the switching frequency of the power switch SP 108. Further, the request frequency $f_{REQ}$ may determine the on-time of the power switch SP 108. The drive circuit 130 may include a frequency to on-time converter to translate the request frequency $f_{REQ}$ to an on-time for the power switch SP 108.

Ripple compensation block 129 is coupled to receive the scaled output sense signal SOS 126 and outputs the compensation signal CMP 133. In response to the scaled output sense signal SOS 126, the ripple compensation block 129 determines how much to compensate the request signal REQ 134. In one example, the ripple compensation block 129 provides a compensation signal CMP 133, which is a portion of the scaled output sense signal SOS 126 to the request control 128. In other words, the compensation signal CMP 133 is a fraction of the scaled output sense signal SOS 126. The request control 128 receives the compensation signal CMP 133 and modulates the request signal REQ 134 with the compensation signal CMP 133 to provide ripple compensation at the output of the power converter. As mentioned above, the compensated request frequency $f_{REQ}$ increases if the scaled output sense signal SOS 126 is less than the target value 131, and decreases if the scaled output sense signal SOS 126 is greater than the target value 131. Thus, in response to the compensation signal CMP 133, the request frequency $f_{REQ}$ decreases if the scaled output sense signal SOS 126 is greater than the target value 131. Further, the request frequency $f_{REQ}$ could increase in response to the compensation signal CMP 133 if the scaled output sense signal SOS 126 is less than the target value 131.

Controller 122 may be implemented as a monolithic integrated circuit or may be implemented with discrete electrical components or a combination of discrete and integrated components. Controller 122 and the power switch SP 108 could form part of an integrated circuit that is manufactured as either a hybrid or monolithic integrated circuit. In one example, the entire controller 122 may be referenced to the primary return (and return 125 may be equal to the input return 109) and the output sense circuit 120 may provide the galvanic isolation between the controller 122 and the secondary side of the power converter. Examples of the output sense circuit 120 could include an optocoupler or a secondary side bias winding of the energy transfer element T1 104. However, as will be shown in FIG. 1B, some components of controller 122 may be referenced to the input return 109 while other components of controller 122 may be referenced to the secondary return 115. For that example, galvanic isolation may be provided by communication link 138.

Figure 1B:
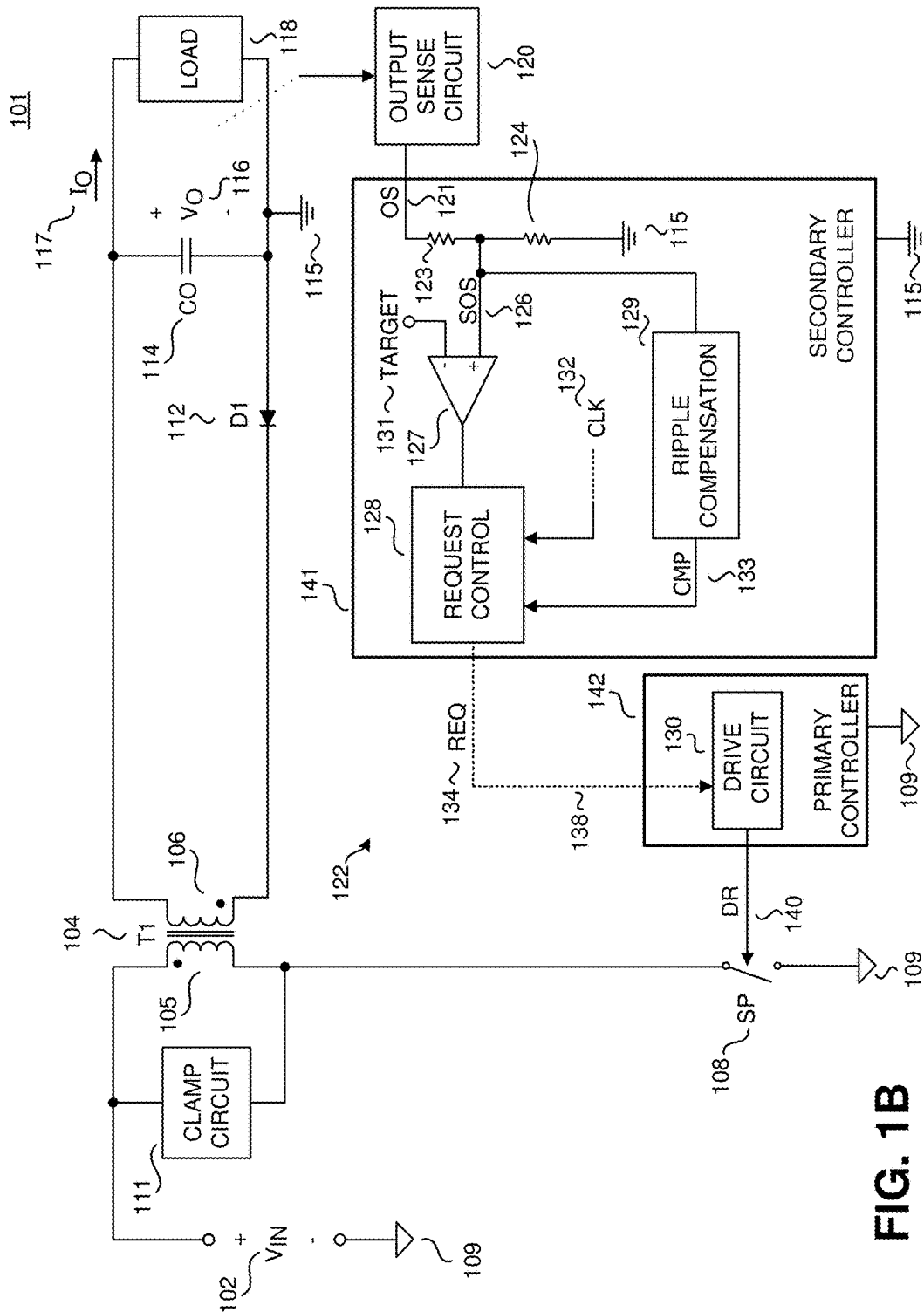
FIG. 1B is a schematic illustrating an example power converter, primary controller, and secondary controller with ripple compensation in accordance with an embodiment of the present invention.

FIG. 1B is a schematic illustrating another example power converter 101, primary controller 142, and secondary controller 141 with ripple compensation 129 in accordance with the teachings of the present disclosure. The power converter 101 example shown in FIG. 1B shares many of the same elements as the power converter 100 illustrated in FIG. 1A, and it should be understood that similarly named and numbered elements couple and function as discussed above. At least one difference, however, is that the controller 122 includes a primary controller 142 and a secondary controller 141. The primary controller 142 includes the drive circuit 130 and is referenced to the input return 109. Primary controller 142 controls the switching of the power switch SP 108 via the drive signal DR 140. The primary controller 142 and the secondary controller 141 may communicate via communication link 138. In one example, the primary controller 142 and the secondary controller 141 are galvanically isolated from one another, and the communication link 138 provides galvanic isolation using an inductive coupling, such as a transformer or a coupled inductor, an optocoupler, capacitive coupling, or other device that maintains the galvanic isolation.

As shown, the secondary controller 141 outputs the request signal REQ 134 to the primary controller 142 and is referenced to the output return 115. In the example shown, the secondary controller 141 includes the resistors 123 and 124, comparator 127, request control 128, and ripple compensation block 129. The voltage divider formed by resistors 123 and 124 are referenced to output return 115. In another example, the power converter 101 could utilize a synchronous rectifier (such as a transistor) for output rectifier D1 112. For that case, the secondary controller 141 could also output a secondary drive signal to control the synchronous rectifier.

In one example, primary controller 142 and secondary controller 141 may be formed as part of an integrated circuit that is manufactured as either a hybrid or monolithic integrated circuit. In one example the power switch SP 108 may also be integrated in a single integrated circuit package with the primary controller 142 and the secondary controller 141. In addition, in one example, primary controller 124 and secondary controller 141 may be formed as separate integrated circuits. The power switch SP 108 may also be integrated in the same integrated circuit as the primary controller 142 or could be formed on its own integrated circuit. Further, it should be appreciated that both the primary controller 142, the secondary controller 141, and power switch SP 108 need not be included in a single package, and may be implemented in separate controller packages or a combination of combined/separate packages.

Figure 1C:
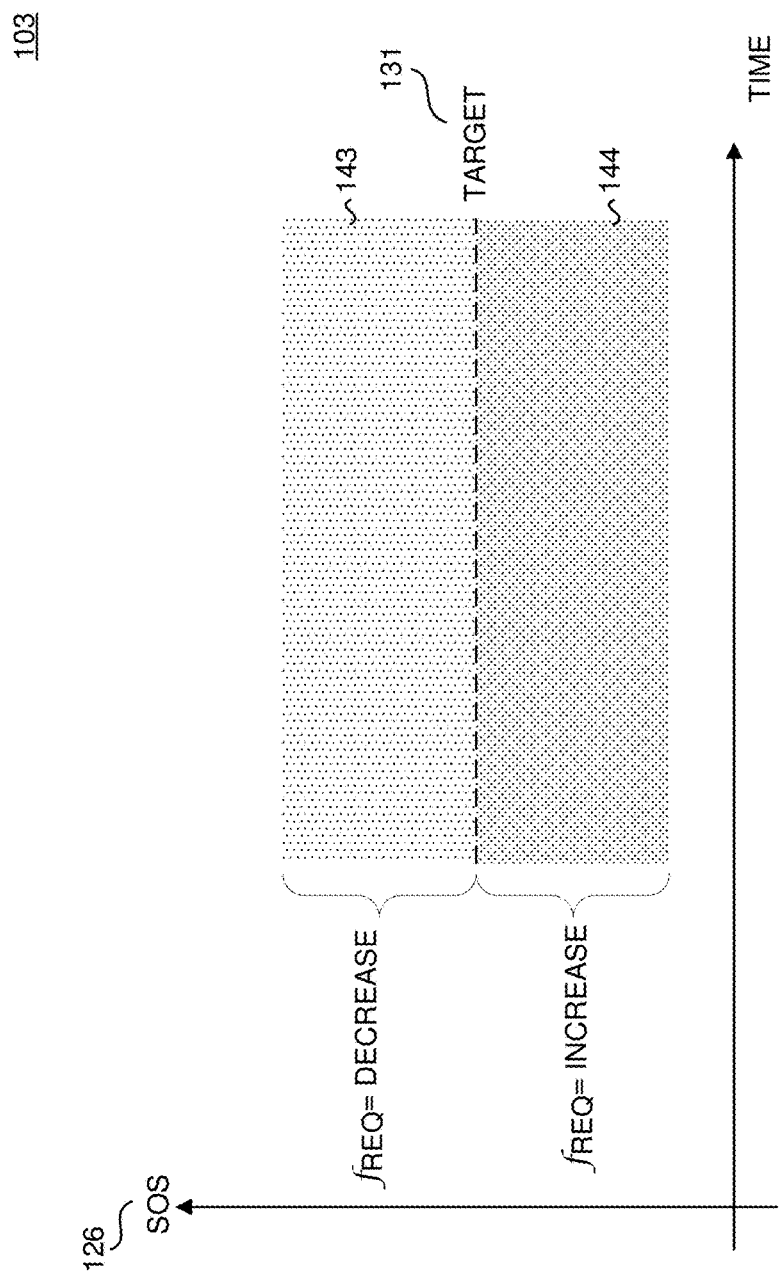
FIG. 1C is a timing diagram illustrating various operating bands of ripple compensation of the example power converters of FIGS. 1A-1B in accordance with an embodiment of the present invention.

FIG. 1C is a timing diagram 103 illustrating various operating bands of ripple compensation block 129 of the example power converters of FIGS. 1A-1B in accordance with an embodiment of the present invention. As shown in timing diagram 103, if the scaled output sense signal SOS 126 is greater than the target value 131 (which is illustrated as region 143 shown with loosely packed dots in FIG. 1C), the frequency $f_{REQ}$ of the request signal REQ 134 decreases. If the scaled output sense signal SOS 126 is less than the target value 131 (which is illustrated as region 144 shown with densely packed dots in FIG. 1C), the frequency $f_{REQ}$ of the request signal REQ 134 increases.

Figure 2:
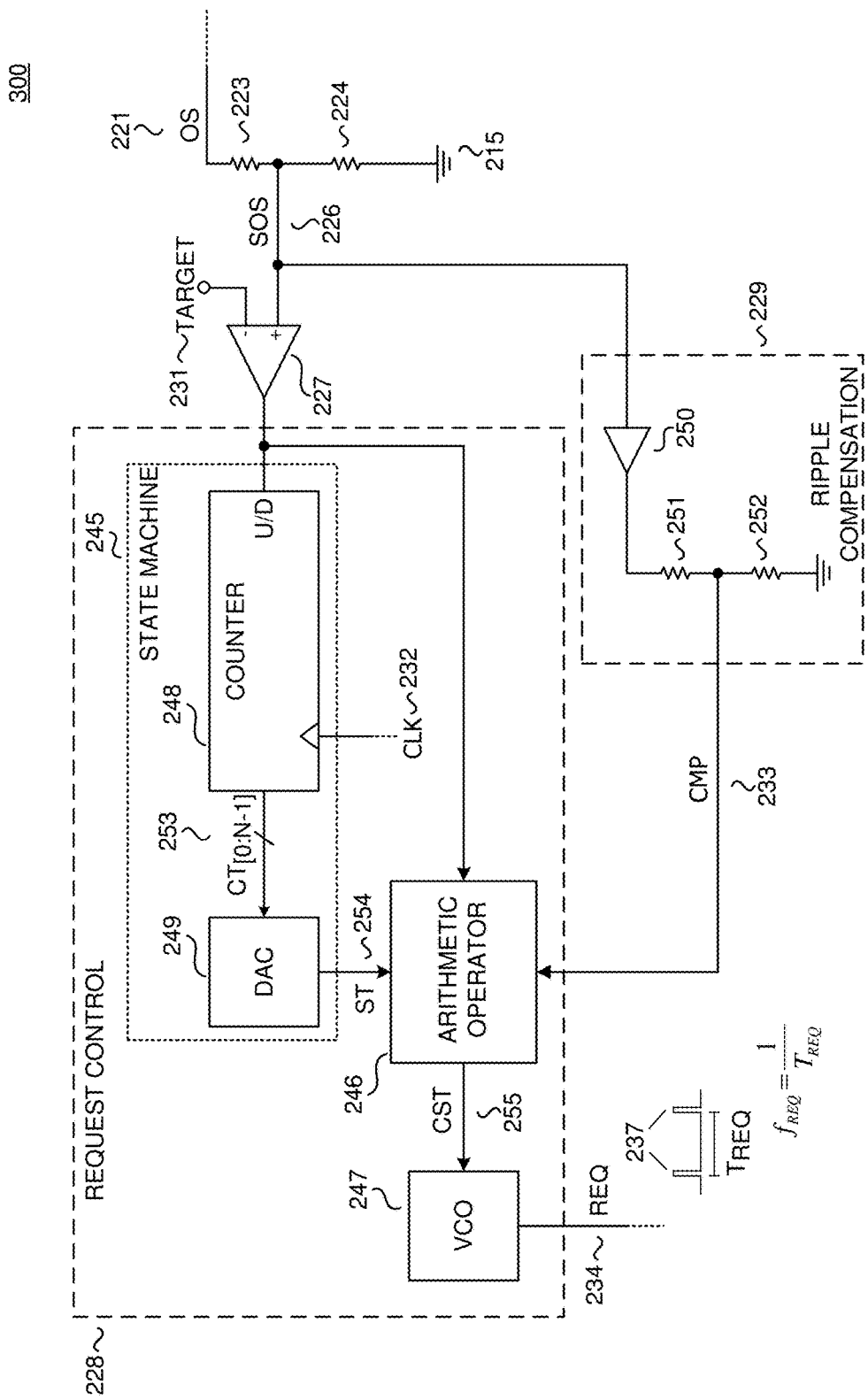
FIG. 2 is a schematic illustrating an example controller of FIGS. 1A-1B in accordance with an embodiment of the present invention.

FIG. 2 is a schematic illustrating an example controller 300 of FIGS. 1A-1B including example implementations of request control 228 and ripple compensation 229 in accordance with an embodiment of the present invention. It should be appreciated that similarly named and numbered elements are coupled and function as described above.

Resistors 223 and 224 are coupled together as a voltage divider for the output sense signal OS 221. As shown, the resistors 223 and 224 are referenced to output return 215, however it should be appreciated they can be referenced to another value. Resistors 223 and 224 produce the scaled output sense signal 226. Comparator 227 is coupled to receive the scaled output sense signal SOS 226 and the target value 231. In one example, comparator 227 receives the target value 231 at its inverting input and the scaled output sense signal SOS 226 at its non-inverting input, which in another example may be reversed.

Request control 228 is shown as including a state machine 245, arithmetic operator 246, and voltage controlled oscillator (VCO) 247. State machine 245 is coupled to receive the output of comparator 227 and the clock signal CLK 232. The state machine 245 outputs the state signal ST 254, which is representative of an operating state of the power converter, and more specifically, an operating state of the power switch. In one example, the state signal ST 254 is representative of the switching frequency and/or on-time of the power switch. State signal ST 254 may be an analog signal representative of a digital value. The state machine 245 updates the state signal ST 254 in response to the output of the comparator 227. The speed at which the state machine 245 is updated is responsive to the frequency of the clock signal CLK 232.

State machine 245 is shown as including a counter 248 and digital-to-analog converter (DAC) 249. Counter 248 is coupled to receive the output of comparator 227 at its U/D input and the clock signal CLK 232 at its clock input. The counter 248 outputs a count signal CT 253, which may be an N-bit digital signal. In operation, the counter 248 updates its internal count in response to the output of comparator 227 at a speed indicated by the clock signal CLK 232. In one example, the counter 248 counts up when the scaled output sense signal SOS 226 is greater than the target value 231 and counts down when the scaled output sense signal SOS 226 is less than the target value 231. Alternatively, the counter 248 may count up when the scaled output sense signal SOS 226 is less than the target value 231 and counts down when the scaled output sense signal SOS 226 is greater than the target value 231. The count signal CT 253 may be the internal count of the counter 248.

DAC 249 is coupled to receive the count signal CT 253 and outputs the state signal ST 254. In operation, the DAC 249 determines the value for the state signal ST 254 from the received digital count signal CT 253. In one example, the state signal ST 254 may be a voltage signal and the greater the digital value of count signal CT 253, the greater the voltage of the state signal ST 254.

The count signal CT 253 (i.e., internal count of the counter 248) and the state signal ST 254 are representative of an operating condition of the power switch. In one example, they may be representative of switching frequency (i.e., the request frequency $f_{REQ}$ of the request signal 336) and the on-time of the power switch. As will be discussed further with FIGS. 3A-3B, an increasing digital count signal CT 253 and state signal ST 254 may correspond to increasing switching frequency/request frequency $f_{REQ}$. In another example, a decreasing count signal CT 253 and state signal ST 254 may correspond to increasing switching frequency/request frequency $f_{REQ}$.

The arithmetic operator 246 is coupled to receive the output of comparator 227, the state signal ST 254, and the compensation signal CMP 233, and outputs the compensated state signal CST 255. As will be further discussed, the arithmetic operator 246 adds or subtracts the compensation signal CMP 233 to or from the state signal ST 254 in response to the output of comparator 227. In other words, the arithmetic operator 246 is coupled to modulate the state signal ST 254 with the compensation signal CMP 233 in response to the output of comparator 227 to generate the compensated state signal CST 255.

The VCO 247 is coupled to receive the compensated state signal CST 255 from arithmetic operator 246 and outputs the request signal REQ 234. In one example, the request signal REQ 234 may be a rectangular pulse waveform which pulses to a logic high value and quickly returns to a logic low value. The logic high pulses may be referred to as request events 237. The time between leading edges of the request events 237 (or trailing edges) may be referred to as the request period $T_{REQ}$ and the request frequency $f_{REQ}$ is the reciprocal of the request period $T_{REQ}$. The request frequency $f_{REQ}$ (and ergo the request period $T_{REQ}$) of the request events 237 may be responsive to the value of the compensated state signal ST 255. In one example, an increasing value of the compensated state signal CST 255 may correspond to a decreasing request frequency $f_{REQ}$ (and ergo an increasing request period $T_{REQ}$) as shown in the state machine of FIG. 3A. In another example, an increasing value of the compensated state signal CST 255 may correspond to an increasing request frequency f (and ergo a decreasing increasing request period $T_{REQ}$) as shown in the state machine of FIG. 3B.

The ripple compensation 229 includes a buffer 250 and resistors 251 and 252. Buffer 250 is coupled to receive and buffers the scaled output sense signal SOS 226. Resistors 251 and 252 are coupled together as a voltage divider for the scaled output sense signal SOS 226 and are referenced to output return 215. As shown, the compensation signal CMP 233 is the divided scaled output sense signal SOS 226. In other words, the compensation signal CMP 233 is a fraction of the scaled output sense signal SOS 226, which is a further fraction of the output sense signal OS 221. The values of resistors 251 and 252 may be selected such that the compensation signal CMP 233 is 2-8% of the scaled output sense signal SOS 226. In one example, 8% of the scaled output sense signal SOS 226 corresponds to 0.31% of the sensed output signal 221 while 12% of the scaled output sense signal SOS 226 corresponds to 0.47% of the sensed output signal 221, or in other words, 1% of the scaled output sense signal SOS 226 corresponds to about 0.04% of the sensed output signal 221.

In operation, if the scaled output sense signal SOS 326 is greater than the target value 231, the arithmetic operator 246 modulates the state signal ST 254 with the compensation signal CMP 233 such that the request frequency $f_{REQ}$ of the request signal REQ 234 further decreases as compared to if the state signal ST 254 is not compensated. For the example that an increasing value of the state signal ST 254 and ergo the compensated state signal CST 255 corresponds to a decreasing request frequency $f_{REQ}$ (i.e., the higher the state, the slower the request frequency $f_{REQ}$ as shown in the state machine of FIG. 3A), the arithmetic operator 246 adds the compensation signal CMP 233 to the state signal ST 254. As such, the VCO 247 outputs a request signal REQ 234 with a request frequency $f_{REQ}$ that is lower than the request frequency corresponding to the non-compensated state signal ST 254.

For the example that an increasing value of the state signal ST 254 and ergo the compensated state signal CST 255 corresponds to an increasing request frequency $f_{REQ}$ (i.e., the higher the state, the faster the request frequency $f_{REQ}$ as shown in the state machine of FIG. 3B), the arithmetic operator 246 subtracts the compensation signal CMP 233 from the state signal ST 254. As such, the VCO 247 outputs a request signal REQ 234 with a request frequency $f_{REQ}$ that is lower than the request frequency corresponding to the non-compensated state signal ST 254.

Similarly, if the scaled output sense signal is less than the target value 231, the arithmetic operator 246 can modulate the state signal ST 254 with the compensation signal CMP 233 such that the request frequency $f_{REQ}$ of the request signal REQ 234 further increases as compared to if the state signal ST 254 is not compensated. For the example that an increasing value of the state signal ST 254 and ergo the compensated state signal CST 255 corresponds to a decreasing request frequency $f_{REQ}$ (i.e., the higher the state, the slower the request frequency $f_{REQ}$ as shown in the state machine of FIG. 3A), the arithmetic operator 246 subtracts the compensation signal CMP 233 to the state signal ST 254. As such, the VCO 247 outputs a request signal REQ 234 with a request frequency $f_{REQ}$ that is faster than the request frequency corresponding to the non-compensated state signal ST 254.

For the example that an increasing value of the state signal ST 254 and ergo the compensated state signal CST 255 corresponds to an increasing request frequency $f_{REQ}$ (i.e., the higher the state, the faster the request frequency $f_{REQ}$ as shown in the state machine of FIG. 3B), the arithmetic operator 246 adds the compensation signal CMP 233 to the state signal ST 254. As such, the VCO 247 outputs a request signal REQ 234 with a request frequency $f_{REQ}$ that is faster than the request frequency corresponding to the non-compensated state signal ST 254.

FIGS. 3A-3B illustrate state tables 300 and 301 of example relationships between the switching frequency/request frequency $f_{REQ}$ and the on-time $t_{ON}$ of the power switch. As mentioned above, the counter may be an N-bit counter and as such, the state machine may have $2^N$ number of states. In state table 300 shown in FIG. 3A, as the state/count of the state machine increases, the request frequency $f_{REQ}$ and on-time $t_{ON}$ decrease. Or in other words, as the state/count of the state machine increases, the request period $T_{REQ}$ increases. For implementing state table 300, the VCO could translate the state signal into the request period $T_{REQ}$. Further, the arithmetic operator adds when the scaled output sense signal is greater than the target value and subtracts when the scaled output sense signal is less than the target value. In the state table 301 shown in FIG. 3B, as the state/count of the state machine increases, the frequency request frequency $f_{REQ}$ and on-time $t_{ON}$ increase. Or in other words, as the state/count of the state machine increases, the request period $T_{REQ}$ decreases. For implementing state table 301, the VCO could translate the state signal into the request frequency $f_{REQ}$. Further, the arithmetic operator subtracts when the scaled output sense signal is greater than the target value and adds when the scaled output sense signal is less than the target value.

Figure 4:
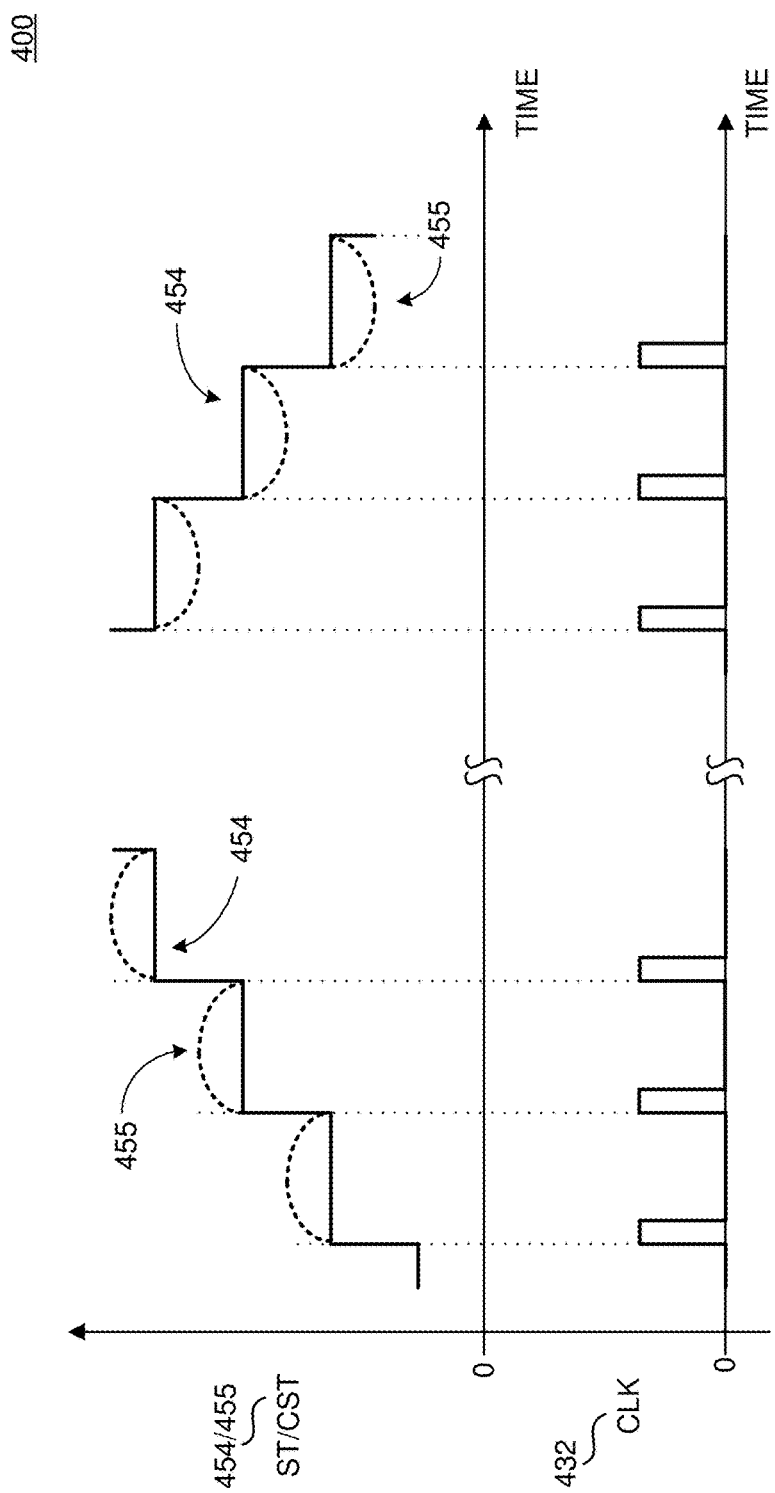
FIG. 4 is a timing diagram illustrating the example state signal and the example compensated state signal of FIG. 2, in accordance with embodiments of the present invention.

FIG. 4 is a timing diagram 400 illustrating the state signal ST 454 and the compensated state signal CST 455. It should be appreciated that similarly named and numbered elements couple and function as described above. As shown, the solid line in FIG. 4 corresponds to the state signal ST 454 while the dotted line in FIG. 4 corresponds to the compensated state signal CST 455.

On the left hand side of timing diagram 400, the example state signal ST 454 increases with every pulse of clock signal CLK 432 and is generally an increasing step function. This example corresponds to the scaled output sense signal SOS (e.g., SOS 326 in FIG. 2) being generally above the target value (e.g., target 231 in FIG. 2). As such, the counter/state machine (e.g., counter 248/state machine 245 in FIG. 2) is counting up and the request frequency $f_{REQ}$ is decreasing. For this example, the arithmetic operator (e.g., arithmetic operator 246 in FIG. 2) adds the compensation signal CMP (e.g., CMP 233 in FIG. 2) to the state signal ST 454 to generate compensated state signal CST 455. In other words, the compensated state signal CST 455 would be the sum of the state signal ST and the compensation signal CMP in this example. Thus, the resulting compensated state signal CST 455 would therefore generally form an upward curved arch for each step of the increasing step function of the state signal ST 454 as shown in FIG. 4.

On the right hand side of timing diagram 400, the example state signal ST 454 decreases with every pulse of clock signal CLK 432 and is generally a decreasing step function. This example could correspond to the scaled output sense signal SOS (e.g., SOS 326 in FIG. 2) being generally below the target value (e.g., target 231 in FIG. 2). As such, the counter/state machine (e.g., counter 248/state machine 245 in FIG. 2) is counting down and the request frequency $f_{REQ}$ is increasing. For this example, the arithmetic operator (e.g., arithmetic operator 246 in FIG. 2) subtracts the compensation signal CMP (e.g., CMP 233 in FIG. 2) from the state signal ST 454 to generate compensated state signal CST 455. In other words, the compensated state signal CST 455 would be the difference between the state signal ST and the compensation signal CMP in this example. Thus, each step of the resulting compensated state signal CST 455 would generally form a downward curved arch for each step of the decreasing step function of the state signal ST 454 as shown in FIG. 4.

Figure 5:
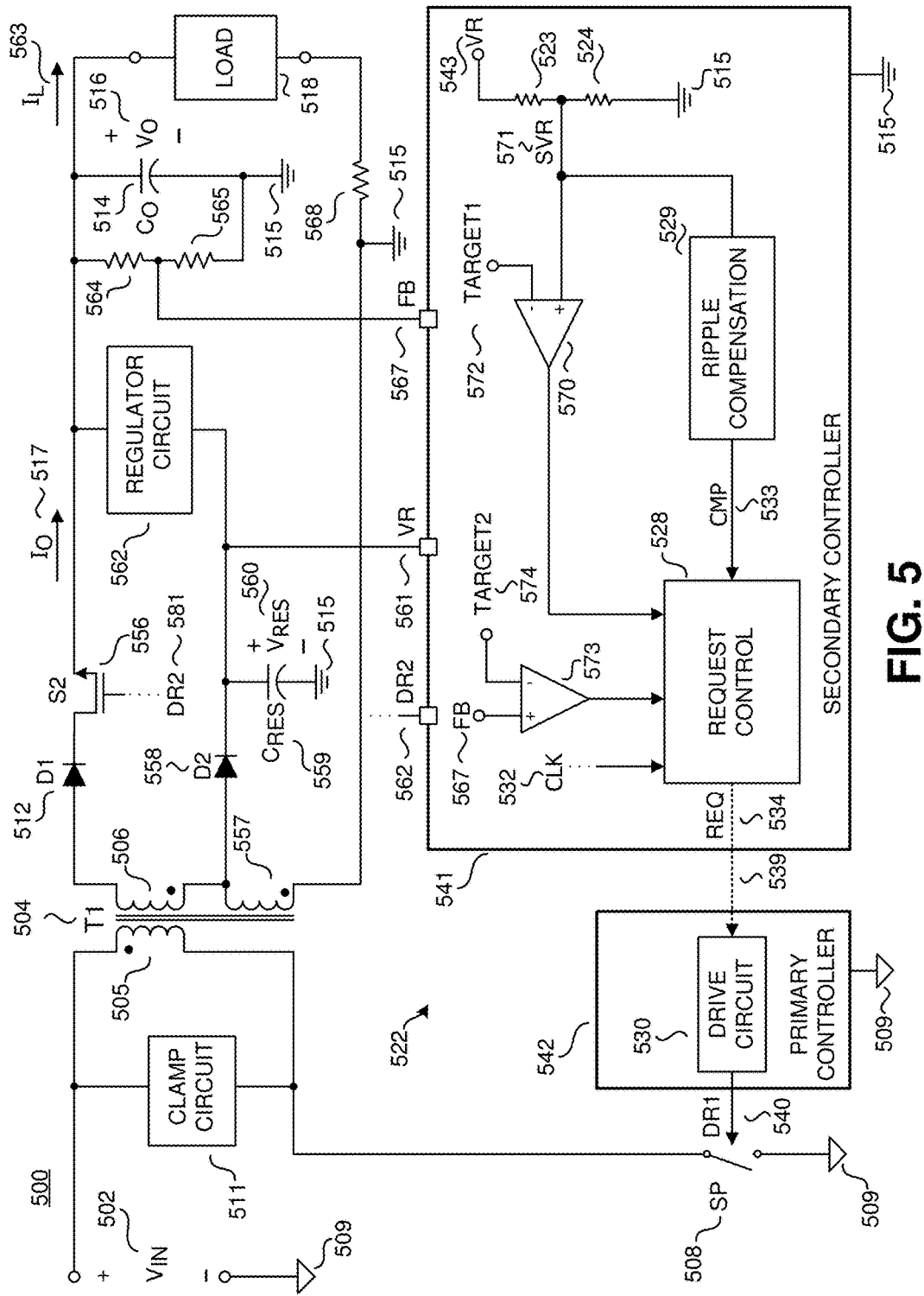
FIG. 5 is a schematic illustrating an example power converter, an example primary controller and an example secondary controller with ripple compensation in accordance with embodiments of the present invention.

FIG. 5 is illustrates another example power converter 500 that utilizes a secondary controller ripple compensation 529. The power converter 500 shown in FIG. 5 shares many of the same elements as the power converters illustrated in FIGS. 1A-1B, and it should be understood that similarly named and numbered elements couple and function as discussed above. The controller 522 of power converter 500 includes a primary controller 542 and secondary controller 541. At least one difference, however, is that the power converter 500 is a multi-output power converter including a first output and a second output, and the energy transfer element T1 504 has a first output winding 506 coupled to the first output and a second output winding 557 coupled to the second output of power converter 500.

In addition, the power converter 500 further includes a regulator circuit 562 coupled between the multiple outputs of the power converter 500. The secondary controller 541 receives multiple output sense signals OS as described above. As will be further discussed, the feedback signal FB 567 representative of the output of the first output winding 506 may be an example of the output sense signal OS. Reservoir sense VR 560, representative of the output of the second output winding 557, may be another example of the output sense signal OS. Further, the primary controller 542 outputs a primary drive signal DR1 540 that controls the switching of the power switch SP 508 to control energy delivery from the primary side to the secondary side of the power converter 500. The secondary controller 541 outputs a secondary drive signal DR2 that controls the switching of a pass switch S2 556 to control energy delivery to the output capacitor 514.

Power converter 500 provides output power to the load 518 from an unregulated input voltage $V_{IN}$ 502, which in one example is a rectified ac line voltage or a rectified and filtered ac line voltage. The input voltage $V_{IN}$ 502 is coupled to be received by the energy transfer element 504. The example energy transfer element 504 shown in FIG. 5 includes three windings, an input winding 505, a first output winding 506 and a second output winding 557. Coupled across the input winding 505 is the clamp circuit 511, which limits the maximum voltage across a power switch SP 508 that is coupled to the primary winding 505 and an input return 509 as shown. Primary controller 542 includes the drive circuit 530 that provides drive signal DR1 540 to open and close power switch SP 508. Drive signal DR1 540 may be a voltage or current signal. Similar to what was discussed above, the drive circuit 530 turns on the power switch SP 508 in response to request events in the request signal REQ 534 from the secondary controller 541.

Output rectifier D1 512 is coupled to first output winding 506. A pass switch S2 556 is coupled to the output rectifier 512 and the output capacitor 514, and opens and closes in response to secondary drive signal DR2 581 from the secondary controller 541 to provide a regulated output voltage $V_O$ 516, output current $I_O$ 517, or a combination of the two to the load 518. In the example power converter 500, the output voltage 516 is positive with respect to an output return 515, which is galvanically isolated from the input return 509 by the energy transfer element T1 504. Secondary drive signal DR2 581 may be a voltage or a current signal. Resistors 564 and 565 are coupled in series across the output capacitor CO 514 and provide the feedback signal FB 567 to the secondary controller 541. As shown, the resistors 564 and 565 form a voltage divider for the output voltage $V_O$ 516. As such, the feedback signal FB 567 is representative of the output voltage $V_O$ 516, and specifically a scaled version of the output voltage $V_O$ 516.

Primary controller 542 and secondary controller 541 control the power switch SP 508 such that the input current of the power converter 500 is proportional to the input voltage $V_{IN}$ 502 by a factor that is substantially fixed throughout a half line period to maintain high power factor. Further, the primary controller 542 and secondary controller 541 control the power switch SP 508 to regulate the output voltage $V_O$ 516, output current $I_O$ 517, or a combination of the two. As will be further discussed, the secondary controller 541 utilizes the feedback signal FB 567 and the reservoir sense VR 561 to determine when to switch the power switch SP 508. A current sense resistor 568 may be coupled in series to the load 518 to provide a current sense signal (not shown) to the secondary controller 541.

When the instantaneous input power of the power converter 500 exceeds the demand of the load (plus some loss), the secondary controller 541 switches the pass switch S2 556 off to prevent the output voltage $V_O$ 516 from exceeding its desired value. In one example, the secondary controller 541 compares the feedback signal FB 567 to an output voltage reference to determine when to turn on and turn off the pass switch S2 556. If the feedback signal FB 567 exceeds the output voltage reference, the secondary controller 541 may output the secondary drive signal DR2 581 to control the pass switch S2 556 off. If the feedback signal FB 567 is less than the output voltage reference, the pass switch S2 556 is controlled on. When pass switch S2 556 on first output winding 506 is open (i.e., off), surplus energy from the output produces a current in the second output winding 557 and second output rectifier D2 558 to store the surplus energy in reservoir capacitor CRES 559. As shown, the output rectifier D2 558 and reservoir capacitor CRES 559 are coupled across the second output winding 557. The reservoir voltage VRES 560 is the voltage across reservoir capacitor CRES 559 and is referenced to the output return 515. The secondary controller 541 receives a reservoir sense signal VR 561, which is representative of the reservoir voltage VRES 560. In other examples, output rectifier D2 558 may be a switch driven by secondary controller 541.

Regulator circuit 562 is coupled between the reservoir capacitor CRES 559 and the output capacitor CO 514. Regulator circuit 562 may be a non-isolated power converter, such as a boost or buck-boost converter. A buck converter could also be used for regulator circuit 562. For that example, the second output winding 557 would be coupled to output capacitor CO 514 to provide output voltage $V_O$ 516 and output current $I_O$ 517 while the first output winding 506 is coupled to reservoir capacitor CRES 559 to provide reservoir voltage VRES 560. When the instantaneous input power is less than the demand of the load 518 plus the loss in the power conversion circuits, regulator circuit 562 receives current from the reservoir capacitor CRES 559 to supplement the energy delivered to the load 518. In one example, the reservoir voltage VRES 560 increases when the energy transfer element T1 505 is delivering more energy to the output of the power converter (i.e., load 518) than needed. The reservoir voltage VRES 560 is substantially constant when the energy transfer element T1 505 is delivering the energy needed to the output of the power converter and the reservoir voltage VRES 560 decreases when the energy transfer element T1 505 is not delivering the energy needed. In other words, the reservoir voltage VRES 560 decreases when the regulator circuit 552 is pulling current from the reservoir capacitor CRES 559. As such, the reservoir sense signal VR 561 representative of the reservoir voltage VRES 560 is also representative of the amount of energy delivered to output of the power converter 500 and considered an output sense signal OS as discussed above.

Secondary controller 541 is shown as receiving the reservoir sense signal VR 571 and feedback signal FB 567. The secondary controller 541 outputs the secondary drive signal DR2 581 and may also output a control signal for the regulator circuit 562 (not shown). Secondary controller 541 is similar to the secondary controller shown in FIG. 1B and the controller shown in FIGS. 1A and 1t should be appreciated that similarly named and numbered elements couple and function as described above. The secondary controller 541 is shown as including resistors 523 and 524, comparators 570 and 573, request control 528, and ripple compensation 529.

Similar to as discussed above, resistors 523 and 524 are coupled together as a voltage divider for the received reservoir sense signal VR 561 (which is one example of output sense signal OS) and referenced to output return 515. The divided value of the reservoir sense signal VR 561 is shown as scaled reservoir sense signal SVR 571. Comparator 570 is coupled to receive the scaled reservoir sense signal SVR 571 and the first target value TARGET1 572. As shown, the scaled reservoir sense signal SVR 571 is received at the non-inverting input of comparator 570 while the first target value TARGET1 572 is received at the inverting input. Comparator 573 is coupled to receive the feedback signal FB 567 and the second target value TARGET2 574. As shown, the feedback signal FB 567 is received at the non-inverting input of comparator 573 while the second target value TARGET2 574 is received at the inverting input.

In one example, primary and secondary controllers 542 and 541 may operate in a constant voltage region, constant current region, and/or a constant power region. Constant voltage generally refers to regulating the output voltage $V_O$ 516 to a constant value while constant current refers to regulating the output current $I_O$ 517 to a constant, and similarly for constant power. Further, the primary and secondary controllers 542 and 541 may also provide dimming for the load 518.

Request control 528 is coupled to receive the output of comparators 570 and 573. The request control 528 outputs the request signal REQ 534, which may include request events that are generated in response to at least one of the outputs of comparators 570 and 573, and indicates that the primary and secondary controllers 542 and 541 should turn on the power switch SP 508. The request signal REQ 534 may be a rectangular pulse waveform which pulses to a logic high value and quickly returns to a logic low value, and the logic high pulses may be referred to as request events. The time between leading edges or trailing edges of the request events may be referred to as the request period $T_{REQ}$ and the request frequency $f_{REQ}$ is the reciprocal of the request period $T_{REQ}$. The request frequency $f_{REQ}$ (and the subsequent switching frequency of the power switch SP 508) may be responsive to the reservoir sense signal VR 561. The request frequency $f_{REQ}$ may also be responsive to the feedback signal FB 567. In one example, the request frequency $f_{REQ}$ decreases if the scaled reservoir sense signal SVR 571 is greater than the first target value TARGET1 572, and increases if the scaled reservoir sense signal SVR 571 is less than the first target value TARGET1 572. The speed at which the request control 528 updates the frequency $f_{REQ}$ of the request signal REQ 534 is responsive to the frequency of the clock signal CLK 532. In another example, the request frequency $f_{REQ}$ increases if the feedback signal FB 567 is less than the second target value TARGET2 574 and the request frequency $f_{REQ}$ decreases if the scaled reservoir sense signal SVR 571 is greater than the first target value TARGET1 572.

Drive circuit 530 is coupled to receive the request signal REQ 534 through a communication link 539. In the example shown, the drive circuit 530 is coupled to turn on the power switch SP 508 in response to the request events in the request signal REQ 534. In particular, the drive circuit 530 is coupled to generate the drive signal DR1 540 in response to the request events. For example, the drive circuit 530 may transition the drive signal DR 540 to a logic high value (to turn on power switch SP 508) in response to a received enable event. The frequency of the request signal REQ 534 is substantially equal to the switching frequency of the power switch SP 108. Further, the request frequency $f_{REQ}$ may determine the on-time of the power switch SP 508.

Ripple compensation 529 is coupled to receive the scaled reservoir sense signal SVR 571 and outputs the compensation signal CMP 533. In response to the scaled reservoir sense signal SVR 571, the ripple compensation 529 determines how much to compensate the request signal REQ 534. In one example, the ripple compensation 529 provides a fraction of the scaled reservoir sense signal SVR 571 to the request control 528. In other words, the compensation signal CMP 533 is a fraction of the scaled reservoir sense signal SVR 571. The request control 528 receives the compensation signal CMP 533 and modulates the request signal REQ 534. Similar to the example above, the request frequency $f_{REQ}$ increases if the scaled reservoir sense signal SVR 571 is less than the first target value TARGET1 572 or if the feedback signal FB 567 is less than the second target value TARGET2 572, and decreases if the scaled reservoir sense signal SVR 571 is greater than the first target value TARGET1 572. Thus, in response to the compensation signal CMP 533, the request frequency $f_{REQ}$ decreases if the scaled reservoir sense signal SVR 571 is greater than the first target value TARGET1 572. Further, the request frequency $f_{REQ}$ increases in response to the compensation signal CMP 533 if the scaled reservoir sense signal SVR 571 is less than the first target value TARGET1 572.

Figure 6:
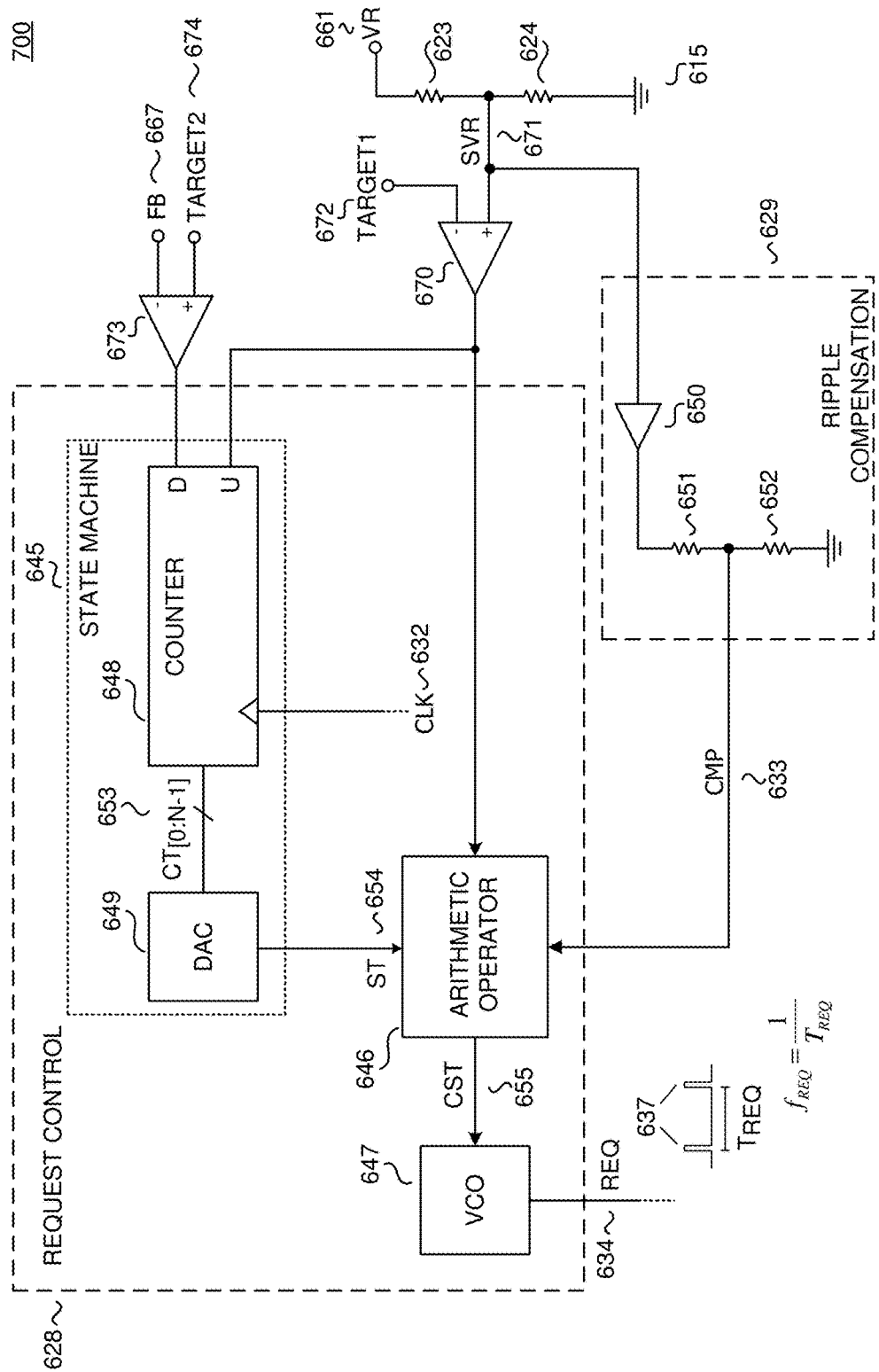
FIG. 6 is a schematic illustrating an example of the secondary controller of FIG. 5 in accordance with embodiments of the present invention.

FIG. 6 is a schematic illustrating elements of an example secondary controller 700, which may be an example of the secondary controller of FIG. 5 in accordance with embodiments of the present invention. The secondary controller example shown in FIG. 6 shares many of the same elements as the example secondary controller example illustrated in FIG. 2, and it should be understood that similarly named and numbered elements are coupled and function as discussed above. At least one difference, however, is that counter 648 in FIG. 6 is coupled to count down in response to the output of comparator 673, which is coupled to compare the feedback signal FB 667 with the second target value TARGET_2 674. In addition the counter 648 in FIG. 6 is coupled to count up in response to the output of comparator 670, which is coupled to compare the scaled reservoir sense SVR 661 and the first target value TARGET_1 672. As shown the scaled reservoir sense SVR 661 is generated by the voltage divider formed with resistors 623 and 624 that are coupled between the reservoir voltage VR 661 and the output return 615. In another example, it is appreciated that just the feedback signal FB 667, or just the reservoir voltage VR 661 could be used to regulate and count up/down of counter 648. Continuing with the depicted example, FIG. 6 also shows that arithmetic operator 646 is coupled to receive the state signal ST 654 and the compensation signal CMP 633 and outputs the compensated state signal CST 655. In the depicted example, the arithmetic operator 646 may also add or subtract the compensation signal CMP 633 to or from the state signal ST 654 in response to the output of comparator 670.

Figure 7:
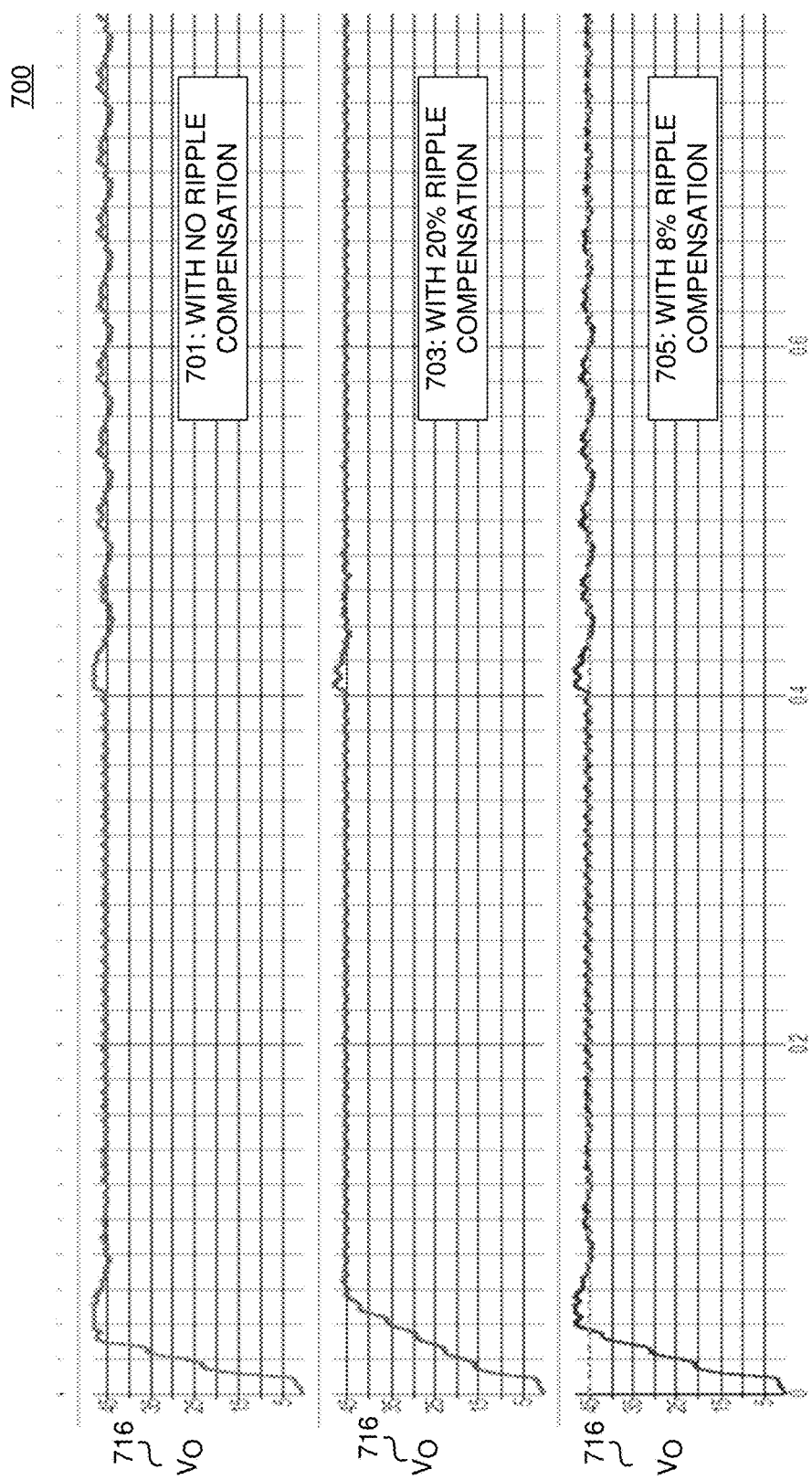
FIG. 7 is a timing diagram illustrating example comparisons of the output of a power converter with varying amounts of ripple compensation in accordance with an embodiment of the present invention.

FIG. 7 is a timing diagram 700 illustrating example comparisons of the output of a power converter with varying amounts of ripple compensation using an example controller with ripple compensation in accordance with an embodiment of the present invention. In particular, trace 701 of timing diagram 700 shows an output voltage $V_O$ 716 with no ripple compensation. In comparison, trace 703 of timing diagram 700 shows the output voltage $V_O$ 716 with 20% ripple compensation of the scaled output sense signal SOS, and trace 705 of timing diagram 700 shows the output voltage $V_O$ 716 with 8% ripple compensation of the scaled output sense signal SOS. As can be appreciated, the output voltage $V_O$ 716 shows reduced ripple in trace 705 with 8% ripple compensation, and even further reduced ripple in trace 703 with 20% ripple compensation in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A controller for use in a switched mode power converter, comprising:
    a comparator coupled to compare an output sense signal representative of an output of the switched mode power converter to a target value;
    a ripple compensation block coupled to generate a compensation signal in response to the output sense signal, wherein the compensation signal is a fraction of the output sense signal; and
    a request control coupled to generate a request signal having a request frequency in response to an output of the comparator and a clock signal to control an operational state of a power switch of the switched mode power converter, wherein the request control is further coupled to receive the compensation signal, wherein the request control is coupled to modulate the request frequency of the request signal with the compensation signal in response to the output of the comparator to provide ripple compensation at the output of the switched mode power converter.

2. The controller of claim 1, wherein the request control is coupled to increase the request frequency of the request signal with the compensation signal if the output sense signal less than the target value.

3. The controller of claim 1, wherein the request control is coupled to decrease the request frequency of the request signal with the compensation signal if the output sense signal greater than the target value.

4. The controller of claim 1, wherein the output sense signal is a scaled representation of the output of the switched mode power converter.

5. The controller of claim 1, wherein the target value is constant.

6. The controller of claim 5, wherein the target value is representative of a target output value for the output of the power converter.

7. The controller of claim 1, wherein the ripple compensation block comprises a voltage divider coupled to generate the compensation signal in response to the output sense signal, such that the compensation signal is the fraction of the output sense signal.

8. The controller of claim 7, wherein the ripple compensation block further comprises a buffer coupled to provide the output sense signal to the voltage divider.

9. The controller of claim 1, wherein the request control comprises:
    a state machine coupled to generate a state signal in response to the output of the comparator and the clock signal;
    an arithmetic operator coupled to the comparator, the state machine, and the ripple compensation block, wherein the arithmetic operator is coupled to modulate the state signal with the compensation signal in response to the output of the comparator to generate a compensated state signal; and
    an oscillator coupled to the arithmetic operator to generate the request signal having the request frequency in response to the compensated state signal.

10. The controller of claim 9, wherein the arithmetic operator is coupled to add the compensation signal to the state signal to generate the compensated state signal if the output sense signal greater than the target value.

11. The controller of claim 9, wherein the arithmetic operator is coupled to subtract the compensation signal from the state signal to generate the compensated state signal if the output sense signal less than the target value.

12. The controller of claim 9, wherein the state machine comprises:
    a counter coupled to generate a count signal in response to the output of the comparator and the clock signal; and
    a digital-to-analog converter coupled to generate the state signal in response to the count signal.

13. The controller of claim 1, wherein the controller further comprises a drive circuit coupled to generate a drive signal in response to request events in the request signal, wherein the drive signal is coupled to control switching of the power switch to control a transfer of energy from an input of the switched mode power converter to the output of the switched mode power converter.

14. The controller of claim 13, wherein the driver circuit is included in a primary controller included in the controller, and wherein the comparator, the ripple compensation block, and the request control are included in a secondary controller included in the controller.

15. The controller of claim 14, wherein the primary controller and the secondary controller are galvanically isolated from one another.

16. The controller of claim 1, wherein the output of the switched mode power converter is a first output of the switched mode power converter, and wherein the comparator is a first comparator of a plurality of comparators, wherein the controller further comprises a second comparator of the plurality of comparators coupled to compare a reservoir sense signal representative of a second output of the switched mode power converter to a second target value, wherein the request control is further coupled to generate the request signal having the request frequency in response to an output of the second comparator to control the operational state of the power switch of the switched mode power converter.

17. A switched mode power converter, comprising:
an energy transfer element coupled between an input of the switched mode power converter and an output of the switched mode power converter;
a power switch coupled to the energy transfer element and the input of the switched mode power converter; and
a controller coupled to generate a drive signal to control switching of the power switch to control a transfer of energy from the input of the switched mode power converter to the output of the switched mode power converter, wherein the controller comprises:
a comparator coupled to compare an output sense signal representative of the output of the switched mode power converter to a target value;
a ripple compensation block coupled to generate a compensation signal in response to the output sense signal, wherein the compensation signal is a fraction of the output sense signal;
a request control coupled to generate a request signal having a request frequency in response to an output of the comparator and a clock signal to control an operational state of a power switch of the switched mode power converter, wherein the request control is further coupled to receive the compensation signal, wherein the request control is coupled to modulate the request frequency of the request signal with the compensation signal in response to the output of the comparator to provide ripple compensation at the output of the switched mode power converter; and
a drive circuit coupled to generate the drive signal in response to request events in the request signal.

18. The switched mode power converter of claim 17, wherein the request control is coupled to increase the request frequency of the request signal with the compensation signal if the output sense signal less than the target value.

19. The switched mode power converter of claim 17, wherein the request control is coupled to decrease the request frequency of the request signal with the compensation signal if the output sense signal greater than the target value.

20. The switched mode power converter of claim 17, wherein the output sense signal is a scaled representation of the output of the switched mode power converter.

21. The switched mode power converter of claim 17, wherein the ripple compensation block comprises a voltage divider coupled to generate the compensation signal in response to the output sense signal, such that the compensation signal is the fraction of the output sense signal.

22. The switched mode power converter of claim 21, wherein the ripple compensation block further comprises a buffer coupled to provide the output sense signal to the voltage divider.

23. The switched mode power converter of claim 17, wherein the request control comprises:
a state machine coupled to generate a state signal in response to the output of the comparator and the clock signal;
an arithmetic operator coupled to the comparator, the state machine, and the ripple compensation block, wherein the arithmetic operator is coupled to modulate the state signal with the compensation signal in response to the output of the comparator to generate a compensated state signal; and
an oscillator coupled to the arithmetic operator to generate the request signal having the request frequency in response to the compensated state signal.

24. The switched mode power converter of claim 23, wherein the arithmetic operator is coupled to add the compensation signal to the state signal to generate the compensated state signal if the output sense signal greater than the target value.

25. The switched mode power converter of claim 23, wherein the arithmetic operator is coupled to subtract the compensation signal from the state signal to generate the compensated state signal if the output sense signal less than the target value.

26. The switched mode power converter of claim 23, wherein the state machine comprises:
a counter coupled to generate a count signal in response to the output of the comparator and the clock signal; and
a digital-to-analog converter coupled to generate the state signal in response to the count signal.

27. The switched mode power converter of claim 17, wherein the driver circuit is included in a primary controller included in the controller, and wherein the comparator, the ripple compensation block, and the request control are included in a secondary controller included in the controller.

28. The switched mode power converter of claim 27, wherein the primary controller and the secondary controller are galvanically isolated from one another.

29. The switched mode power converter of claim 17, wherein the output of the switched mode power converter is a first output of the switched mode power converter, and wherein the comparator is a first comparator of a plurality of comparators, wherein the controller further comprises a second comparator of the plurality of comparators coupled to compare a reservoir sense signal representative of a second output of the switched mode power converter to a second target value,
wherein the request control is further coupled to generate the request signal having the request frequency in response to an output of the second comparator to control the operational state of the power switch of the switched mode power converter.

30. The switched mode power converter of claim 29, wherein the energy transfer element comprises:
an input winding coupled to the input of the switched mode power converter and the power switch;
a first output winding coupled to the first output of the switched mode power converter; and
a second output winding coupled to the second output of the switched mode power converter.

31. The switched mode power converter of claim 29, further comprising a regulator circuit coupled between the first output of the switched mode power converter and the second output of the switched mode power converter.

32. The switched mode power converter of claim 31, wherein the regulator circuit comprises a non-isolated power converter.

* * * * *